United States Patent [19]

Uchiyama et al.

[11] Patent Number: 5,721,794
[45] Date of Patent: Feb. 24, 1998

[54] OPTICAL SWITCH

[75] Inventors: Koichi Uchiyama, Tama; Ryuichi Tagashira, Koganei, both of Japan

[73] Assignee: Kel Corporation, Tokyo, Japan

[21] Appl. No.: 755,305

[22] Filed: Nov. 22, 1996

[51] Int. Cl.$^6$ .................................................. G02B 6/26
[52] U.S. Cl. .......................... 385/19; 385/16; 385/17; 385/18
[58] Field of Search ........................... 385/19, 16, 17, 385/18, 22, 31, 15

[56] References Cited

U.S. PATENT DOCUMENTS

| | | | |
|---|---|---|---|
| 5,440,654 | 8/1995 | Lambert, Jr. | 385/17 |
| 5,548,669 | 8/1996 | Anderson et al. | 385/19 |

*Primary Examiner*—Phan T. H. Palmer
*Attorney, Agent, or Firm*—Robert W. J. Usher

[57] ABSTRACT

An optical switch comprises a pair of optical interrupters 31 and 32, a shutter 41 and a switch knob 61. The optical interrupters are composed of light-emitting elements 11 and 12 and optical fibers 21 and 22. The optical fiber of each optical interrupter is positioned coaxial to the light path of the light-emitting element and faces the light-emitting element with a predetermined space. The shutter 41 has at least one slit 42 to allow light passage and is provided slidable perpendicularly across the light path of the optical interrupters, and the switch knob 61 slides the shutter 41. The optical switch is turned on or off through the operation of the switch knob 61 as the slit 42 of the shutter 41 is positioned in the light paths of the optical interrupters, allowing the light to pass through the slit, or as the barrier portion of the shutter 41 is positioned in the light paths of the optical interrupters, blocking the light.

8 Claims, 9 Drawing Sheets

UNDER
WATER SECTION

OPTICAL SWITCH

BACKGROUND OF THE INVENTION

The present invention relates to optical switches, which are used in the fields of optical communication, optical information processing, optical apparatus, etc., and particularly to an optical switch which is used in an operational unit of a power window of an automobile or to an optical switch which is used in an environment where direct, electrical switching is not suitable.

RELATING PRIOR ARTS

Many of the systems which control driving units require a high voltage and a large current, so switches used there require switching devices with large allowable currents such as relays. Moreover, the switching of the relays used there are controlled through electrical switches.

In automobiles, electrical switches have been applied as operational switches in power windows. For example, an operational unit with a control circuit is placed in a front door. As the operational unit receives power from the battery in the engine hood for actuating the doors, power-supply lines and control lines are drawn from the front door to the other doors through relatively large connectors. Beside this wiring, regulators, motor assemblies, door-locking mechanisms, etc. are placed in the doors. The inside spaces of the doors are packed without any extra space.

One cause of this overcrowding is that power windows are operated with electrical switches. As more and more functions are added to automobiles, operational units and electrical wiring are being enlarged accordingly. As a result, degree of freedom is lost in the positional design of the parts used inside the doors. Thus, there is a need that electrical wires, parts, etc. to be used in the doors be redesigned to occupy less space. Moreover, since the doors of automobiles are often exposed to rain, switches used in the doors need humidity resistance. In addition to this, the insides of the doors with a lot of thick wiring should be protected as much as possible against spark discharge, a phenomenon caused by mechanical contacting points.

Furthermore, as the operational units of power windows are electrical, their wiring is done with metallic wires. Nowadays, the weight of the wiring has reached a point where it no longer can be ignored for energy efficiency. Thus, there is a need for weight reduction.

Optical switches, which use light-emitting elements and optical fibers, have been developed and utilized as a non-contacting switch. However, since they are developed for optical communication, their designs are complex. Therefore, most of them are not suited for use in automobiles. As either mechano optical switches or electro optical switches are of a design in which the path of light is switched, they are not fit to be applied to mobile parts of the doors of automobiles.

SUMMARY OF THE INVENTION

It is an object of the present invention to provide an optical switch which has a simple construction for substituting a conventional electrical switch.

Another object of the present invention is to improve humidity resistance and explosion resistance by making a switch to function without any mechanical contact.

Another object of the present invention is to promote space efficiency and weight saving by reducing the diameter of a wire connected to a switch and to stop the tendency of wires to enlarge as functionality increases.

Yet another object of the present invention is to provide a switch which has a simple design without a water-proof construction and electrical insulation so that the switch can be used in an environment which does not allow the use of electrical switches, for example, in water.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PRESENT INVENTION

Figure 1:
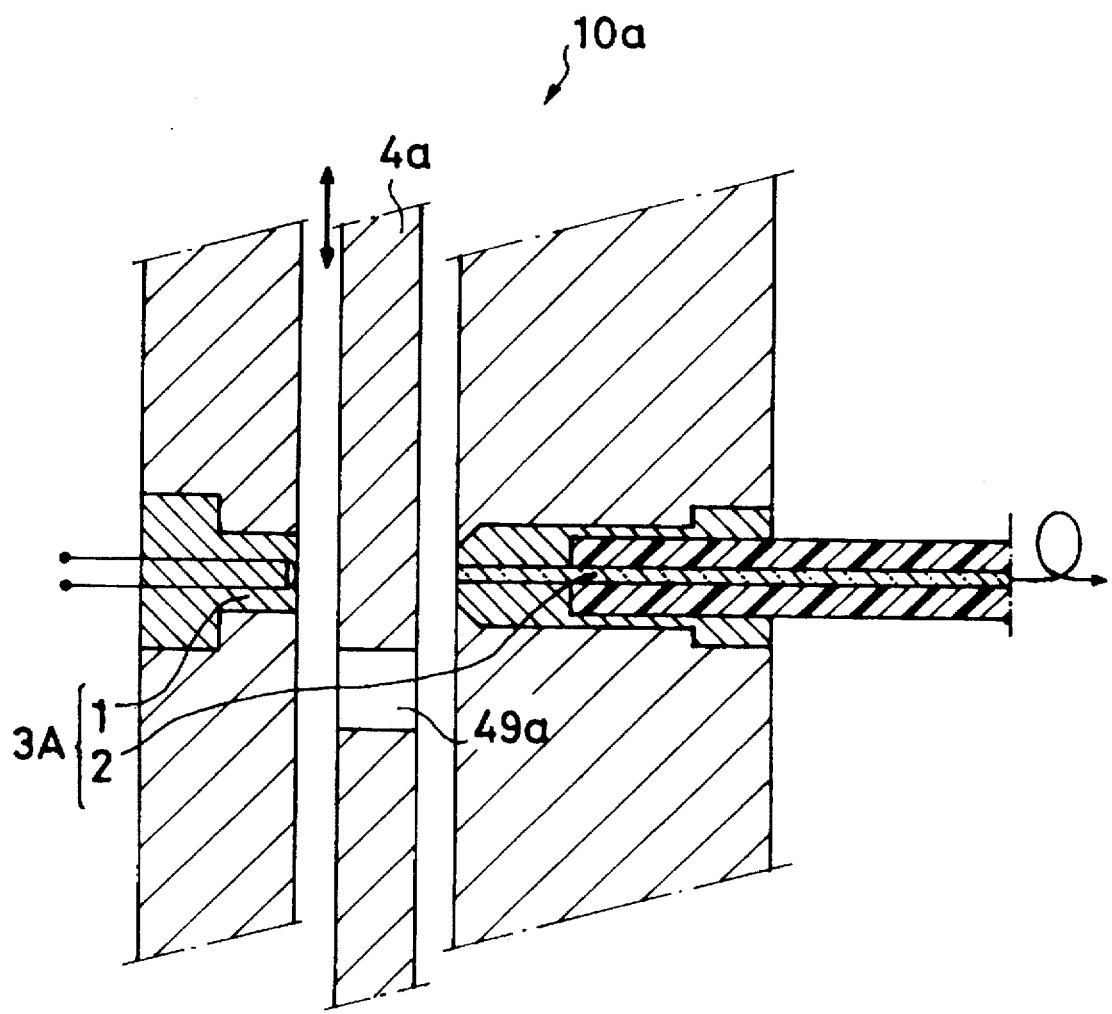
FIG. 1 is a sectional view showing a basic construction of a first type of optical switch according to the present invention.

As shown in FIG. 1, an optical switch 10a according to a first type includes an optical interrupter 3A, a shutter 4a, and shifting means (not shown). The optical interrupter 3A comprises a light-emitting element 1 and an optical fiber 2, which faces the light-emitting element 1 at a predetermined distance in a coaxial light path. The shutter 4a having at least one slit 49a to allow light passage is positioned between the light-emitting element 1 and the optical fiber 2 of the optical interrupter 3A and slid by the shifting means perpendicularly to the light path of the light-emitting element 1.

Figure 2:
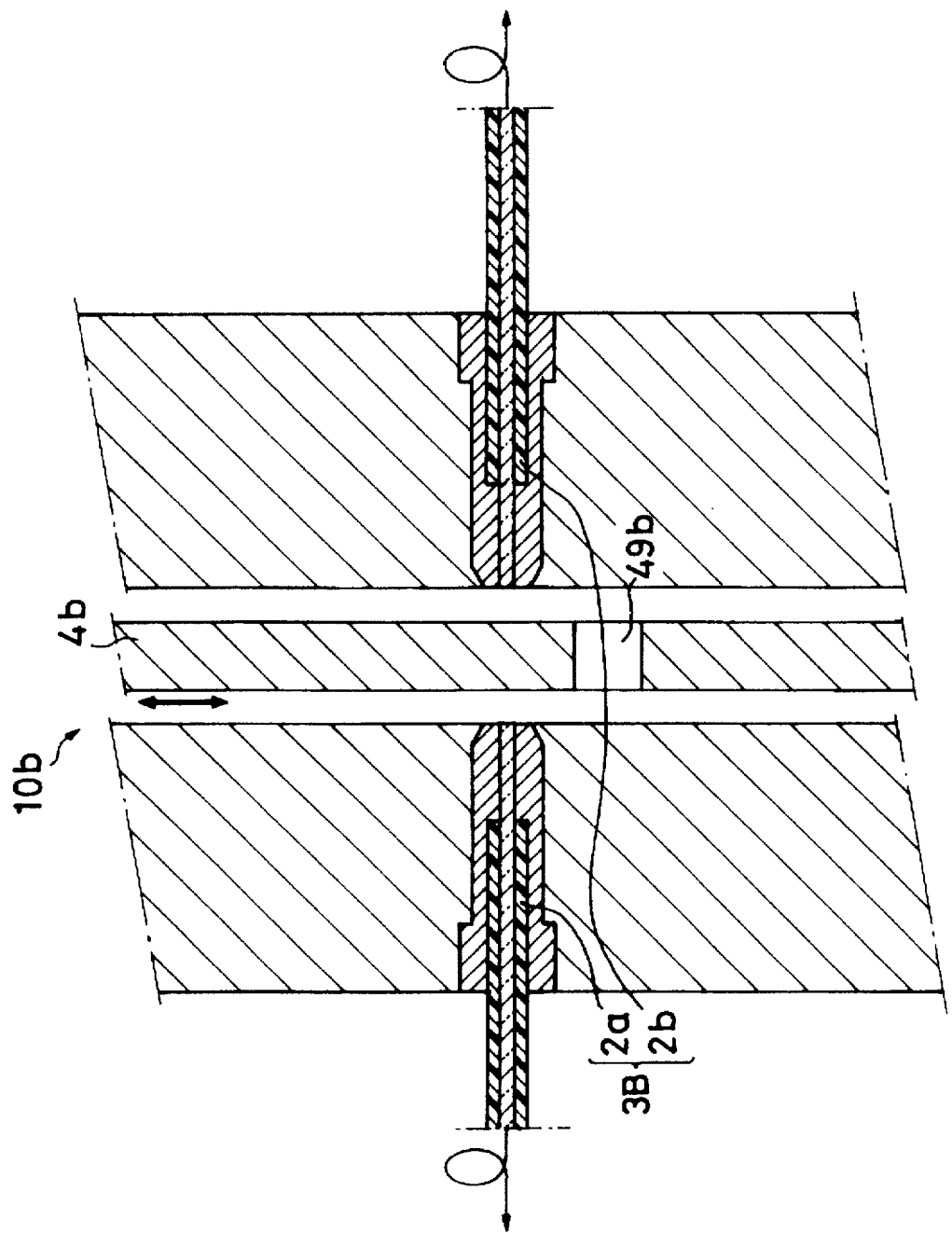
FIG. 2 is a sectional view showing a basic construction of a second type of optical switch according to the present invention.

As shown in FIG. 2, an optical switch 10b according to a second type includes an optical interrupter 3B, a shutter 4b, and shifting means (not shown). The optical interrupter 3B comprises a light-emitting optical fiber 2a and a light-receiving optical fiber 2b, which faces the light-emitting optical fiber 2a at a predetermined distance in a coaxial light path. The shutter 4b having at least one slit 49b to allow light passage is positioned between the light-emitting optical fiber 2a and the light-receiving optical fiber 2b of the optical interrupter 3B, across the light path of the optical interrupter 3B and slid by the shifting means. The slits 49a and 49b of the shutters 4a and 4b can be formed and left as holes, but preferably they should be fitted with lenses so as to transmit the light effectively with convergence and divergence of the light.

In the optical switch 10a according to the first type, while the shifting means is not operated, the barrier portion, i.e., the portion except the slit 49a to allow light passage, of the shutter 4a is positioned across the light path of the optical interrupter 3A. In this way, the light emitted by the light-emitting element 1 is blocked, and it does not reach or propagate through the optical fiber 2. Thus, a light-receiving element, etc. connected at the other end of the optical fiber 2 do not receive the light, so a circuit connected to the light-receiving element never becomes excited. Thereby, the "OFF" condition is kept of the optical switch 10a.

When the shifting means is operated for the shutter 4a to slide upward in FIG. 1, the slit 49a of the shutter 4a comes into the light path of the optical interrupter 3A. As a result, the light emitted by the light-emitting element 1 enters the optical fiber 2 through the slit 49a. The optical fiber 2 makes use of total reflection of light, so there is no way for the light entering the optical fiber 2 to go out of it. The light propagates inside and along the optical fiber 2 even when the fiber 2 bends. Therefore, the light-receiving element, etc. sensing the light at the other end achieves a condition to excite the circuit which is connected to the light-receiving element. In this way, the "ON" condition is achieved of the optical switch 10a.

The optical switch 10b according to the second type works in a similar way as the optical switch 10a according to the first type. However, in the second invention, the optical interrupter 3B is composed of the light-emitting optical fiber 2a and the light-receiving optical fiber 2b so that a light-emitting element, which is connected to the other end of the light-emitting optical fiber 2a, can be placed closer to a light-receiving element, which is connected to the other end of the light-receiving optical fiber 2b. In this way, the optical interrupter 3B does not require electrical contacting points or electrical parts unlike the optical interrupter of the first invention. Without any electrical part, the optical interrupter 3B can be applied and operable in an environment where electrical wiring is not suitable, for example, in water.

The above descriptions are about the functions of the switches, which operate in the two conditions, "ON" and "OFF", according to the present invention. In the optical switch 10a of the first type, if another optical interrupter comprising the light-emitting element 1 and the optical fiber 2 is provided in such a way that the light paths of the two optical interrupters 3A are in parallel with each other, an optical switch is realized with three conditions. Furthermore, it is also possible to realize a multi-condition optical switch by providing the same number of optical interrupters 3A as the number of intended operation selections.

In the same way, in the optical switch 10b of the second type, if another optical interrupter comprising the light-emitting optical fiber 2a and the light-receiving optical fiber 2b is provided in such a way that the light paths of the two optical interrupters 3B are in parallel with each other, an optical switch can be realized with three conditions. Furthermore, it is also possible to realize a multi-condition optical switch with the same number of optical interrupters 3B as the number of intended operation selections.

DESCRIPTION OF THE PREFERRED EMBODIMENTS

Figure 3:
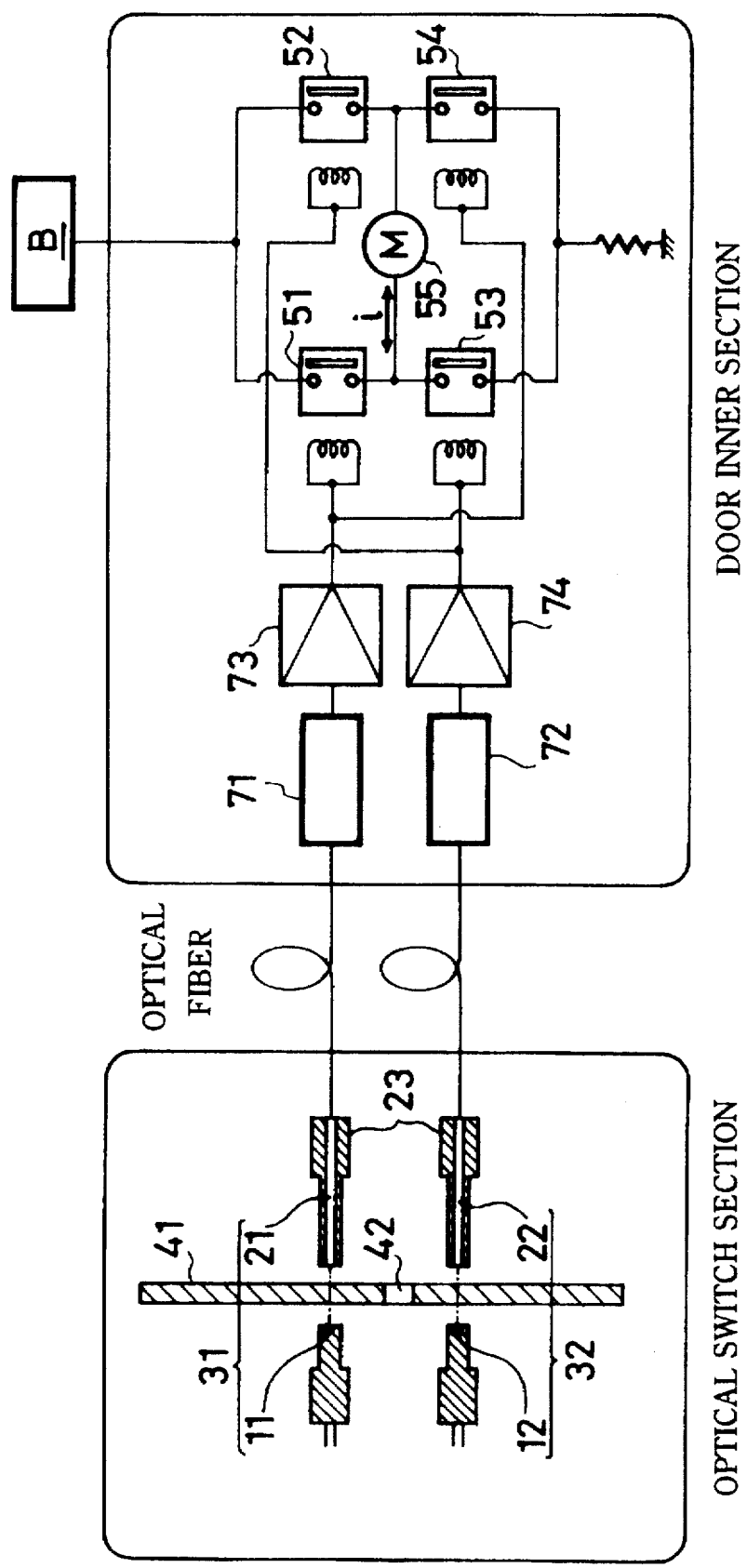
FIG. 3 is a schematic diagram of a first type of optical switch according to the present invention.
Figure 4:
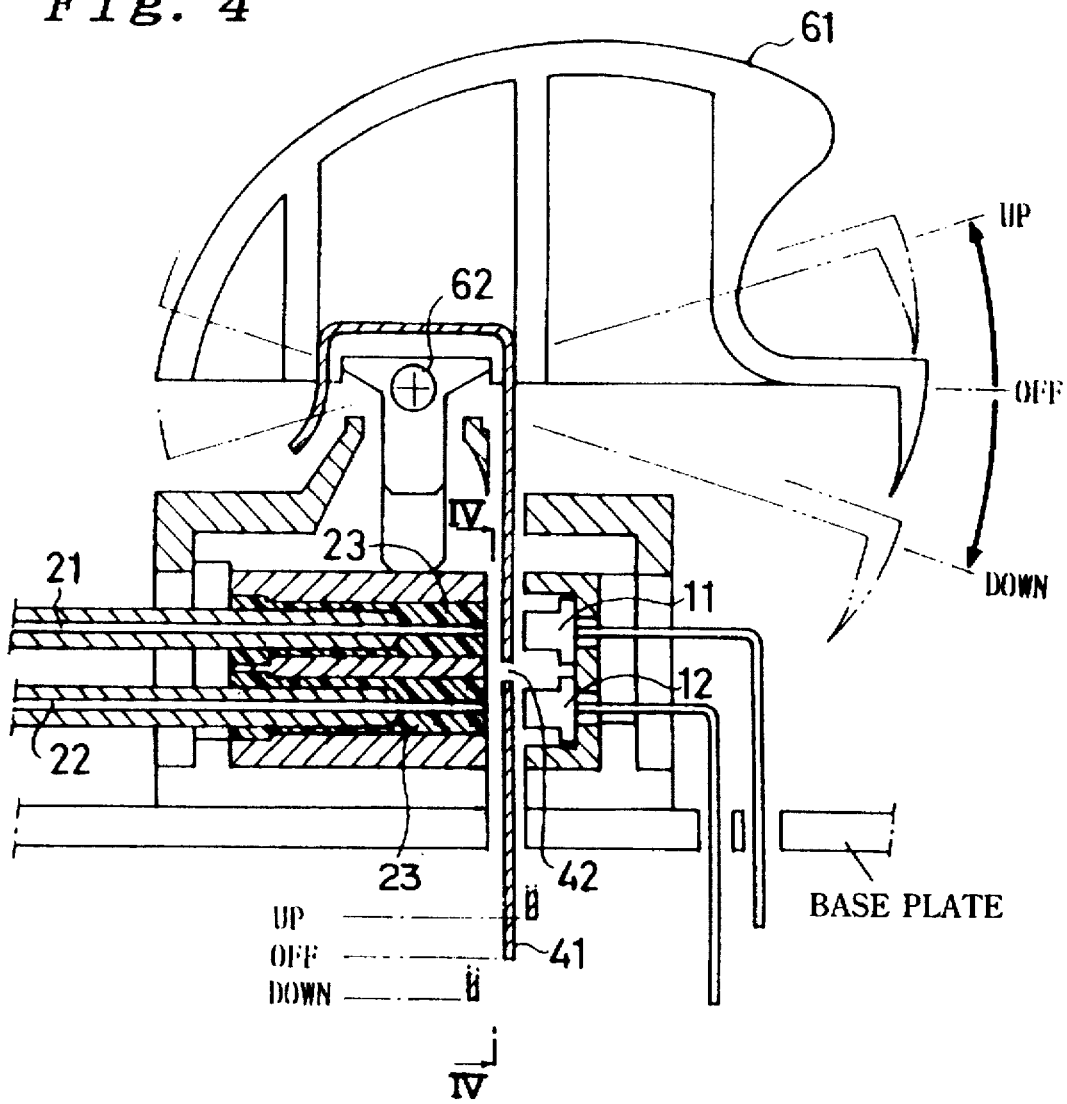
FIG. 4 is a sectional view of a first embodiment of the optical switch according to the first type.

Preferred embodiments according to the present invention are described in the following with reference to the drawings. FIG. 3 is a schematic diagram of an optical switch according to the first type, and the optical switch is used in an operational unit of a power window of an automobile. FIG. 4 is a sectional view showing the construction of the optical switch. As a first embodiment, this optical switch comprises a pair of light-emitting elements 11 and 12, whose light paths are set in parallel with each other, and two optical fibers 21 and 22 for receiving the light.

An light-emitting element 11 or 12 and an optical fiber 21 or 22 together forming an optical interrupter 31 or 32 are positioned coaxial and opposite to each other with a predetermined space between them. The light-emitting elements 11 and 12 are generally made of light-emitting diode (LED) or laser diode (LD). The optical fibers 21 and 22 for light reception are made of various materials, and they are generally made of vitreous silica. However, a plastic optical fiber (POF), which is simple in construction and has a relatively large core diameter, can be applied in this embodiment because this optical switch requires only a short transmission path and does not require a large output. As the cores of the optical fibers 21 and 22 are thin thread, the ends of the fibers facing the light-emitting elements 11 and 12 are preferably provided with ferrules 23. The ferrules 23 retain and strengthen the plastic optical fibers 21 and 22 and also provide ease of assembly.

In the inside space of the optical interrupters 31 and 32, a shutter 41 is provided slidable across the light paths of the light-emitting elements 11 and 12 up and down seen in FIG. 3. As shown in FIG. 4, the upper portion of the shutter 41 is cross-sectionally bent into a rectangle. The lateral sides of the rectangle have a force to open laterally outward, constituting a flat spring. In utilization of this flat spring portion, the shutter 41 is fitted into a space provided in the lower end of a switch knob 61.

The switch knob 61 has a semi-circular shape, and it is rotatable around an eccentric spindle 62, which is positioned at the center of the space inside the rectangular, upper portion of the shutter 41 and to the left of the center of the semi-circular knob. When the switch knob 61 is rotated by pushing a U-cut portion provided at the right end portion of the switch knob up and down with a finger tip, the shutter 41 slides in an approximately vertical direction. In this instance, the rotation of the switch knob 61 is not converted solely into the up and down motion of the shutter 41, but it makes the shutter 41 shift a little to the right or to the left. This lateral motion of the shutter 41 is limited within the predetermined space of the optical interrupters 31 and 32 because a relatively small rotation of the switch knob 61 is required to move the shutter 41 vertically enough distance to turn the optical switch on or off.

Figure 5:
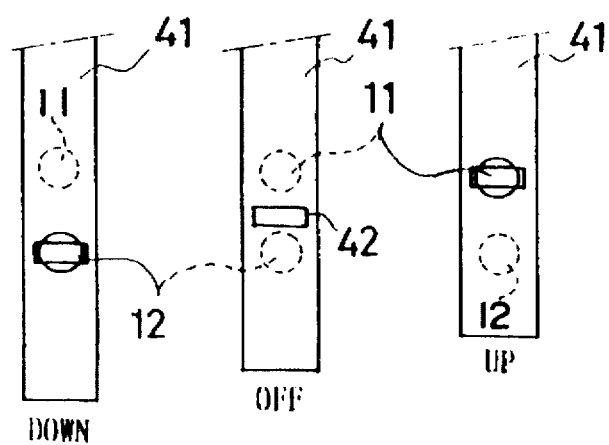
FIGS. 5 are explanatory drawings showing positional relations between a shutter slit and light-emitting elements of the first embodiment according to the first type.

A slit 42 to allow light passage is provided in the shutter 41 in such a way that the slit is positioned approximately at the center between the light path of the first optical interrupter 31 and that of the second optical interrupter 32 when the optical switch is off (refer to "OFF" in FIG. 5). The slit 42 moves up and down along with the shutter 41. Now, when the optical switch is in the "OFF" position as shown in FIG. 4 because the switch knob 61 is not operated, the slit 42 is not in the light path of either the first optical interrupter 31 or the second optical interrupter 32. Therefore, the light emitted from the light-emitting elements 11 and 12 never enters the optical fibers 21 and 22. Thus, both the optical fibers are in the "OFF" condition.

In FIG. 4, when the switch knob 61 is turned counter-clockwise to an "UP" position, the shutter 41 slides upward with a little turn. Then, the slit 42 comes into the light path of the first optical interrupter 31 (refer to "UP" in FIG. 5), and the light emitted from the first light-emitting element 11 enters the first optical fiber 21 while the shutter 41 is still blocking the light path of the second optical interrupter 32. In this instance, a first "ON" condition is established. On the other hand, when the switch knob 61 is turned clockwise to a "DOWN" position, the shutter 41 slides downward in the figure. Then, the slit 42 comes into the light path of the second optical interrupter 32 (refer to "DOWN" in FIG. 5), and the light emitted from the second light-emitting element 12 enters the second optical fiber 22 while the shutter 41 is blocking the light path of the first optical interrupter 31. In this instance, a second "ON" condition is established.

FIGS. 5 are views seen in the direction of the arrows IV in FIG. 4, showing the side of the light-emitting elements to describe positional relations of the first and second light-emitting elements 11 and 12 and the slit 42. The "UP" and "DOWN" are used to indicate the rotational direction of the knob only for convenience, so they do not necessarily correspond with the motions of the power window.

The light entering the optical fiber 21 or 22 passes through the core of the optical fiber in total reflection, which is the principle of optical fiber, and excites light-receiving element 71 or 72 provided in the door (refer to FIG. 3). The light-receiving elements 71 and 72 are usually composed of phototransistors or photodiodes. When the light-receiving element 71 or 72 is excited by the light, conduction is established. An electrical current appears with the existence of an electrical potential difference. This current is too small to excite a driving system by itself, so the current is amplified by a current amplifier 73 or 74 to excite respective solenoids of a relay circuit, turning relay switches 51 through 54 respectively. Since photothyristors have been developed recently, it is also possible to control the switching on or off of a large current without current amplification.

FIG. 3 generally describes a circuit in bridging connection for driving a window motor 55. The window motor 55 is an actuator to move the window up and down. A transmission mechanism provided to the rotating shaft of the motor converts the rotational drive into the up-and-down motion of the window. The switching to the upward or downward motion can be achieved by mechanical means, but in this embodiment it is carded out by switching the rotational direction of the motor 55 so as to make effective use of the limited space inside the door.

When the switch knob 61 is operated to the "UP" position, the first "ON" condition is achieved. The light passes through the first optical fiber 21, and it is sensed by the light-receiving element 71, which closes the relays 51 and 54 which are normally open. As a result, a current supplied from a battery B flows through the motor from the left to the right in FIG. 3 to rotate the window motor 55 clockwise (normal rotation). On the other hand, when the switch knob 61 is operated to the "DOWN" position, the second "ON" condition is achieved. The light passes through the second optical fiber 22, and it is sensed by the light-receiving element 72, which closes the relays 52 and 53 which are normally open. As a result, a current supplied from the battery B flows through the window motor 55 from the right to the left in FIG. 3 to rotate the motor 55 counter-clockwise (reverse rotation).

When the switch knob 61 is not operated, both the optical interrupters 31 and 32 are in the "OFF" condition. The solenoids of the relays 51 through 54 which are normally open are not excited, and the relays stay open. Because the motor 55 is not supplied with a current, it stays motionless. As described above, operating the switch knob 61 up or down controls the opening and closing of the power window.

The rotational directions of the motor can be reversed by rewiring, so the above description of the rotational directions, normal and reverse, is only for convenience.

Figure 6:
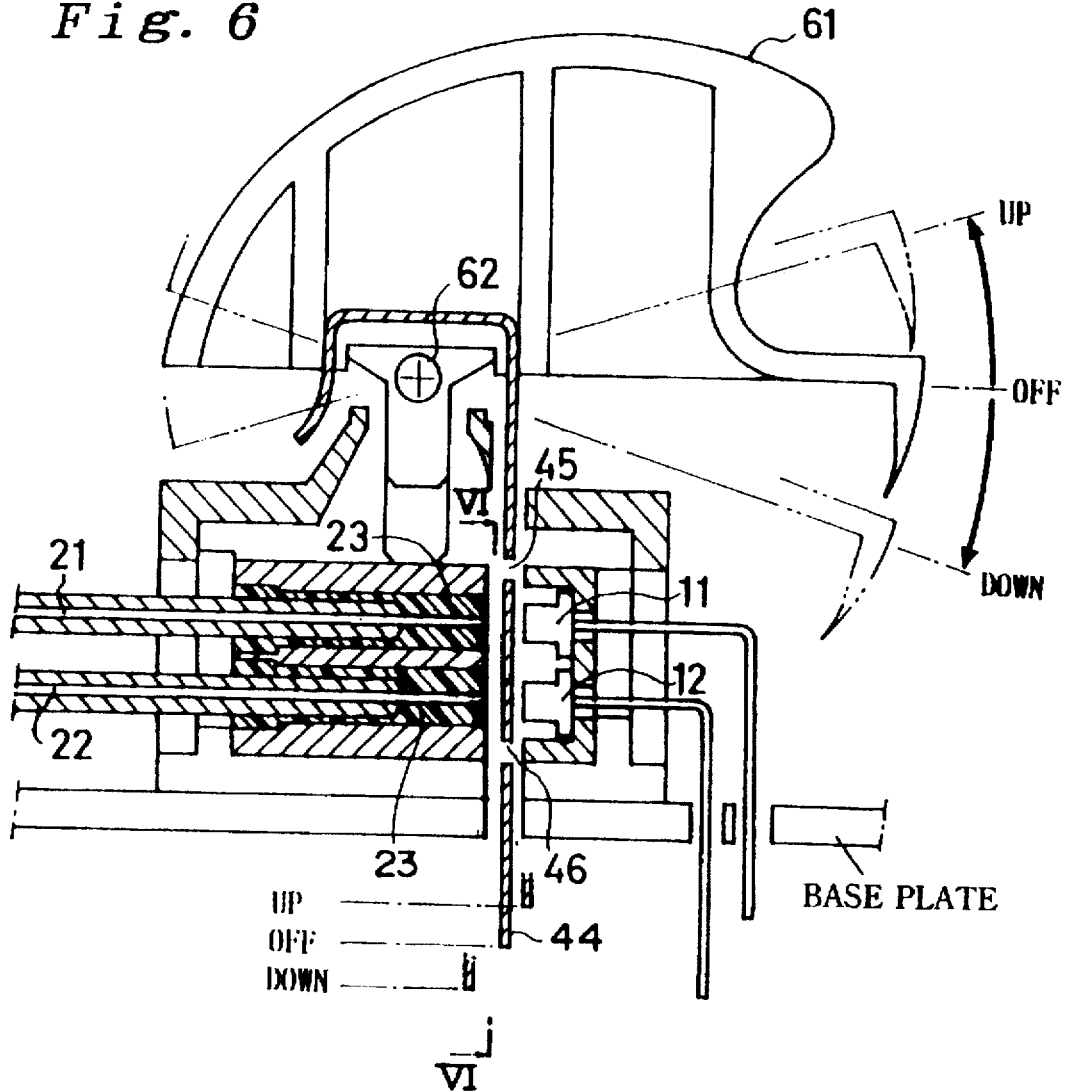
FIG. 6 is a sectional view of a second embodiment of the optical switch according to the first type.

FIG. 6 shows the construction of a second embodiment of the optical switch 10a according to the first type.

It is not different from the first embodiment except the positions and number of slits to allow light passage in the shutter 44, which blocks the light paths of the optical interrupters 31 and 32. In the first embodiment, only one slit 42 is provided in the shutter 41 at the center between the light path of the first optical interrupter 31 and that of the second optical interrupter 32. However, in the second embodiment, two slits, first and second slits 45 and 46, are provided in the shutter, each outside of the light path of the respective optical interrupter 31 or 32 at a predetermined position in the direction of sliding of the shutter 44 (refer to FIG. 7).

Figure 7:
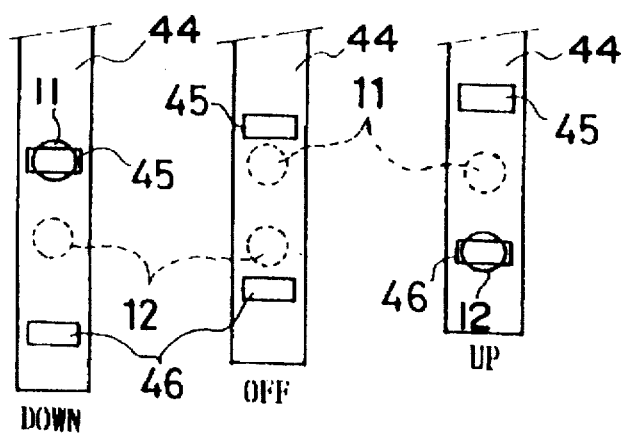
FIGS. 7 are explanatory drawings showing positional relations between two shutter slits and light-emitting elements of the second embodiment according to the first type.

In this embodiment, when the switch knob 61 is operated to the "UP" position, the shutter 44 slides upward as shown in FIG. 6. When the second slit 46 is positioned in the light path of the second optical interrupter 32 (refer to "UP" in FIG. 7) while the first slit 45 is positioned further away from the light path of the first optical interrupter 31, the second "ON" condition is established. When the switch knob 61 is operated to the "DOWN" position, the shutter 44 slides downward as shown in FIG. 6. When the first slit 45 is positioned in the light path of the first optical interrupter 31 (refer to "DOWN" in FIG. 7) while the second slit 46 is positioned further away from the light path of the second optical interrupter 32, the first "ON" condition is established. FIGS. 7 are views seen in the direction of the arrows VI in FIG. 6, showing the side of the light-emitting elements to describe positional relations of the first and second light-emitting elements 11 and 12 and the slits 45 and 46 with respect to the motions of the shutter 44.

With this construction, the blockage of the light transmission is assured to minimize the possibility of malfunction of the optical switch. The light from the first light-emitting element 11 never enters the second optical fiber 22 and vice versa even when the light beams may spread conically outward because of weak convergence of the light emitted from the first and second light-emitting elements 11 and 12 or even when the light paths may no longer parallel themselves with each other.

Figure 8:
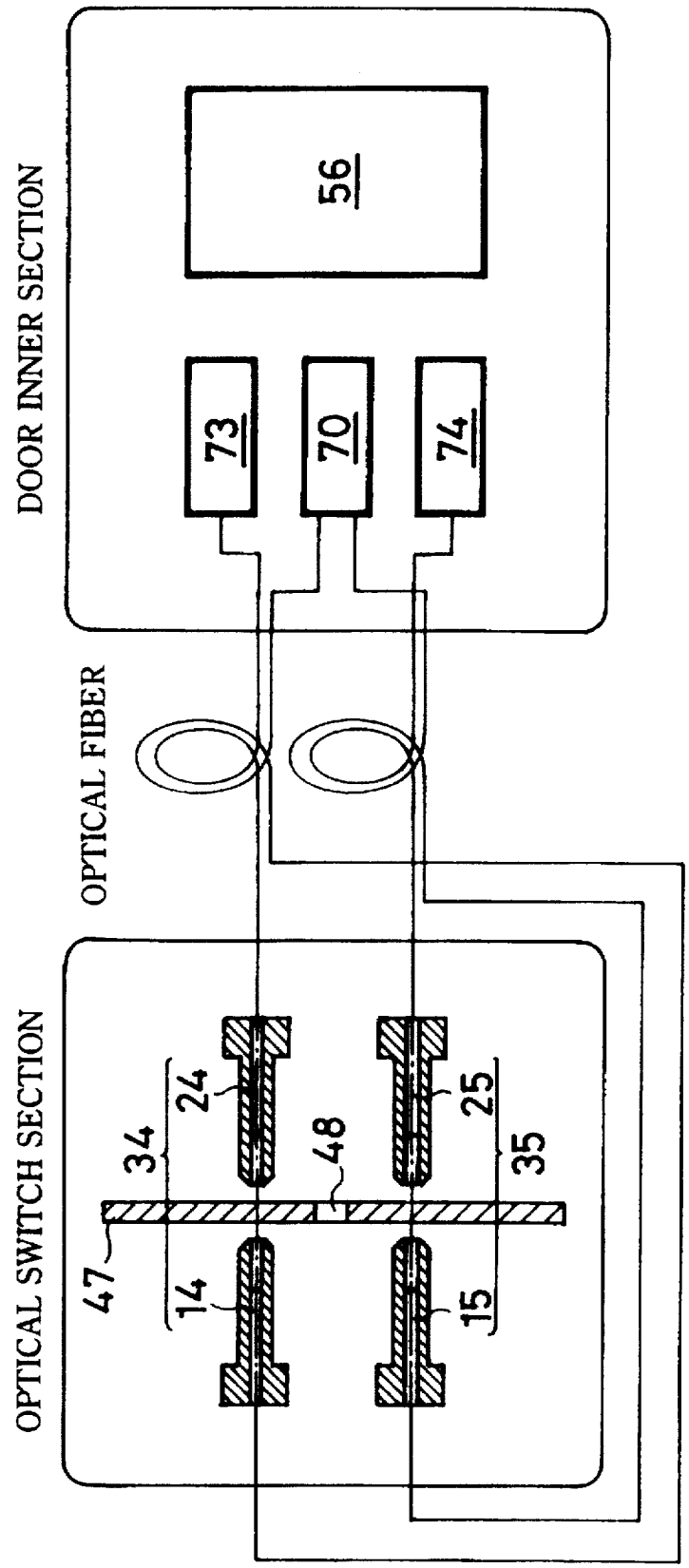
FIG. 8 is a schematic diagram of the optical switch according to the second type.
Figure 9:
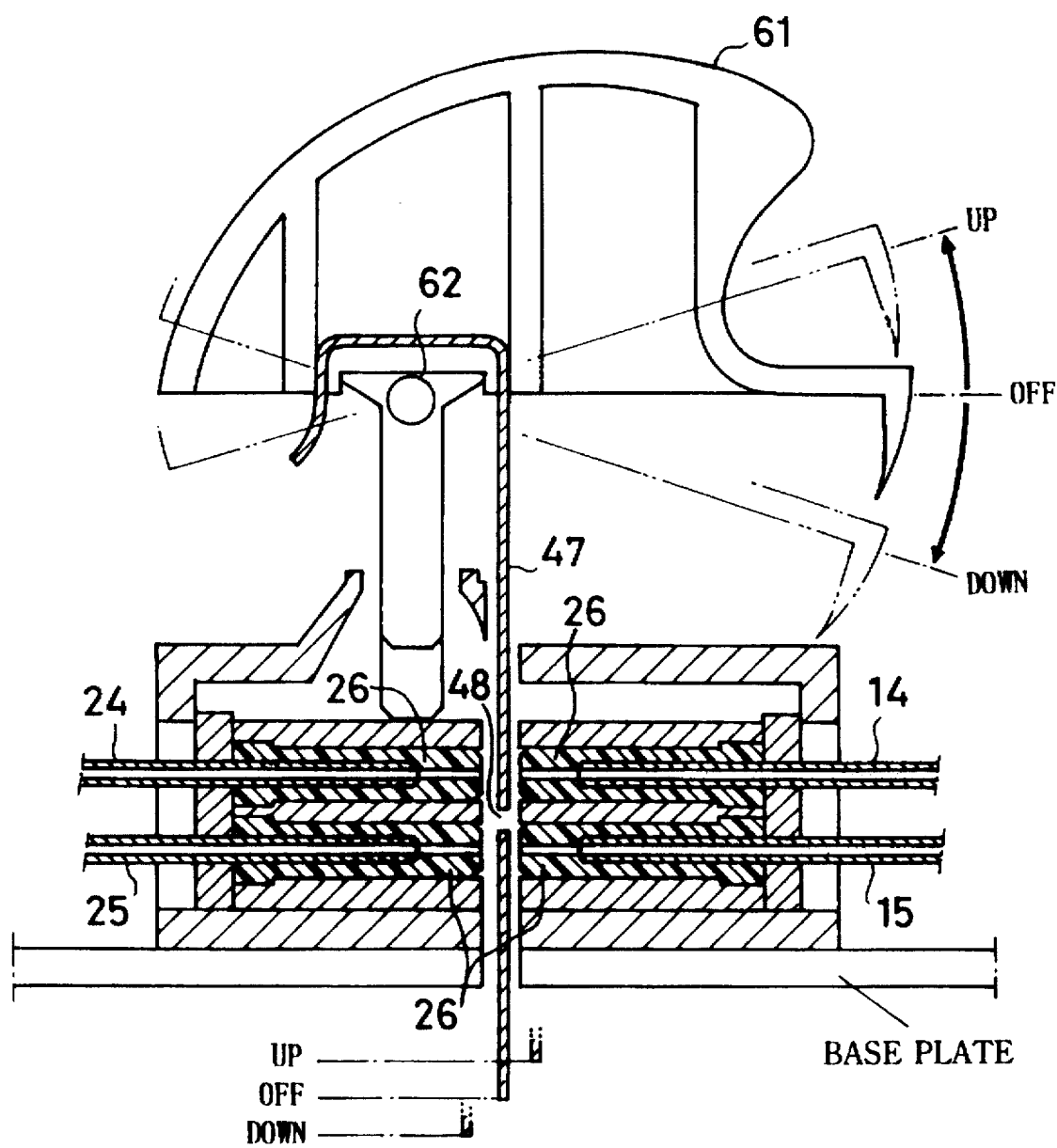
FIG. 9 is a sectional view of a first embodiment of the optical switch according to the second type.

Preferred embodiments according to the second type are described in the following with reference to the drawings. FIG. 8 is a schematic diagram which shows an optical switch according to the secondtype. This optical switch is also used in an operational unit of a power window of an automobile. FIG. 9 is a sectional view which shows the construction of the optical switch. As a first embodiment, this optical switch comprises two light-emitting optical fibers 14 and 15, whose light paths are set in parallel with each other, and two light-receiving optical fibers 24 and 25 for light reception. The basic operation of this optical switch is the same as that of the first invention, so only a simple description is presented.

This optical switch according to the second present invention does not differ from that of the first type in basic construction. Differences are that the light-emitting element 70, which is provided in the optically switching portion in the first type, is now positioned inside the door together with light-receiving elements 73 and 74 and that two optical interrupters 34 and 35 are each composed of a pair of a light-emitting optical fiber 14 or 15 and a light-receiving optical fiber 24 or 25. In this first embodiment, only one slit 48 to allow light passage is provided in the shutter 47 at the mid point between the light paths of the first and second optical interrupters 34 and 35 in the same manner as the first embodiment of the first type.

In the optical switch of the first embodiment constructed as shown in FIG. 9, the light paths of the optical fibers 14 and 15 receiving light from the light-emitting element 70 are blocked by the shutter 47 when the switch knob 61 is at the "OFF" position (refer to FIG. 9). When the switch knob 61 is operated to the "UP" position, the shutter 47 slides upward in the figure, and the slit 48 comes into the light path of the first optical interrupter 34. As a result, a first "ON" condition is established. On the other hand, when the switch knob 61 is operated to the "DOWN" position, the shutter 47 slides downward in the figure, and the slit 48 comes into the light path of the second optical interrupter 35. As a result, a second "ON" condition is established. As described above, the up-and-down rotational operation of the switch knob 61 controls to open and close the power window of the automobile.

Furthermore, in the optical switch according to the second type, a plurality of slits to allow light passage can be provided outside of the light paths of the first and second optical interrupters 34 or 35 respectively at predetermined positions in the direction of sliding of the shutter 47 (not shown) in the same way as the second embodiment of the first type. With this construction, the light transmission is securely blocked to minimize the possibility of malfunction in the optical switch in the same manner as the second embodiment of the first type.

Figure 10:
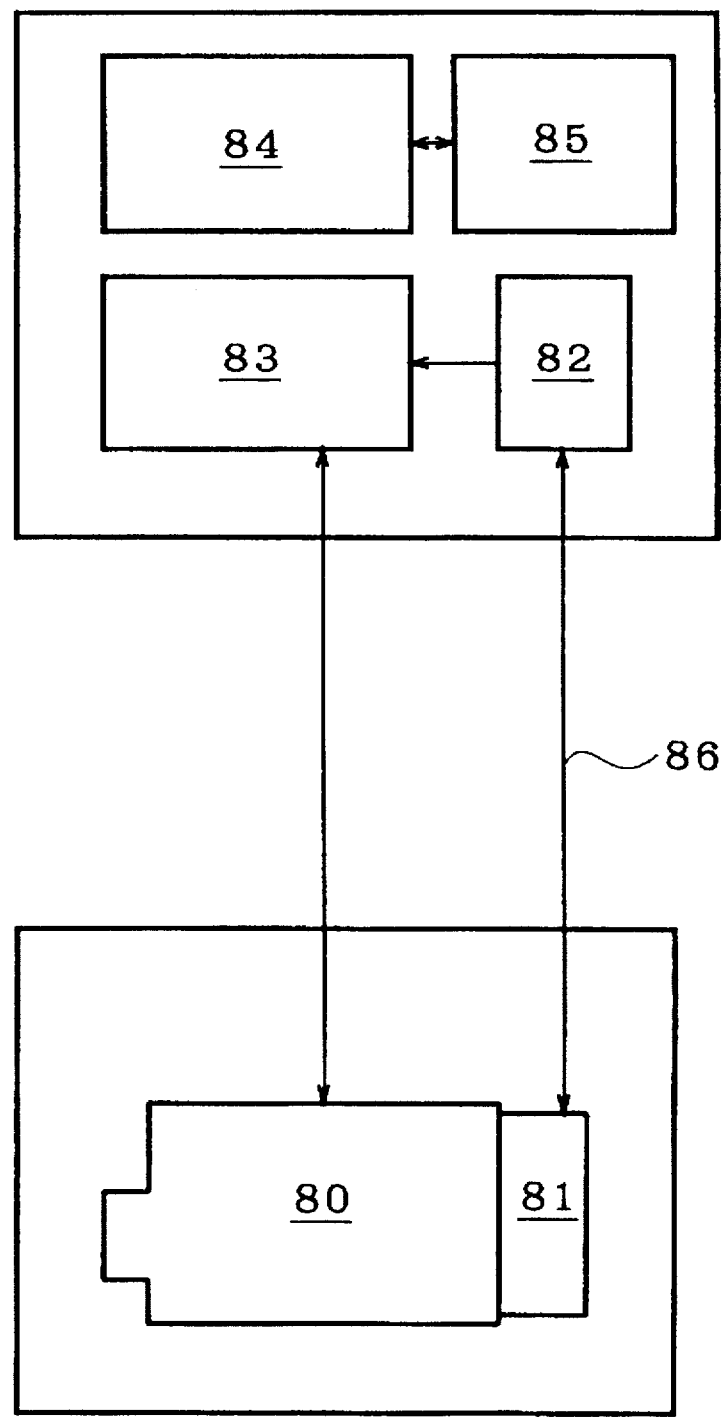
FIG. 10 is a block diagram showing the optical switch according to the second type applied in another use.

Moreover, the optical switch according to the second type does not use any power source or electrical wiring in the switching portion, so there is no need to provide the switching portion with water proofing or electrical insulation. This makes it possible that this optical switch be used in an unfavorable environment, e.g., in water. As such an embodiment, a block diagram is presented in FIG. 10, showing that an optical switch according to the present invention can be used as an external switch of an underwater digital video camera.

A light-emitting element and a light-receiving element 82 are provided in a field operational unit. These elements are connected with the external operational switch 81 of the underwater video camera 80. When an underwater cameraman wants to operate the video camera, he operates the external operational switch 81. This information is received by the light-receiving element 82 through the optical fiber 86 and transmitted to a control circuit 83. The control circuit 83 actuates the video camera 80, and video signals are transmitted between the video camera 80 and the control circuit 83. Resulting images are recorded in a memory 84 and displayed on a display 85. As described above, the optical switch according to the second type involves no electrical construction, so it can be used without any electrical insulation or water proofing.

Figure 11:
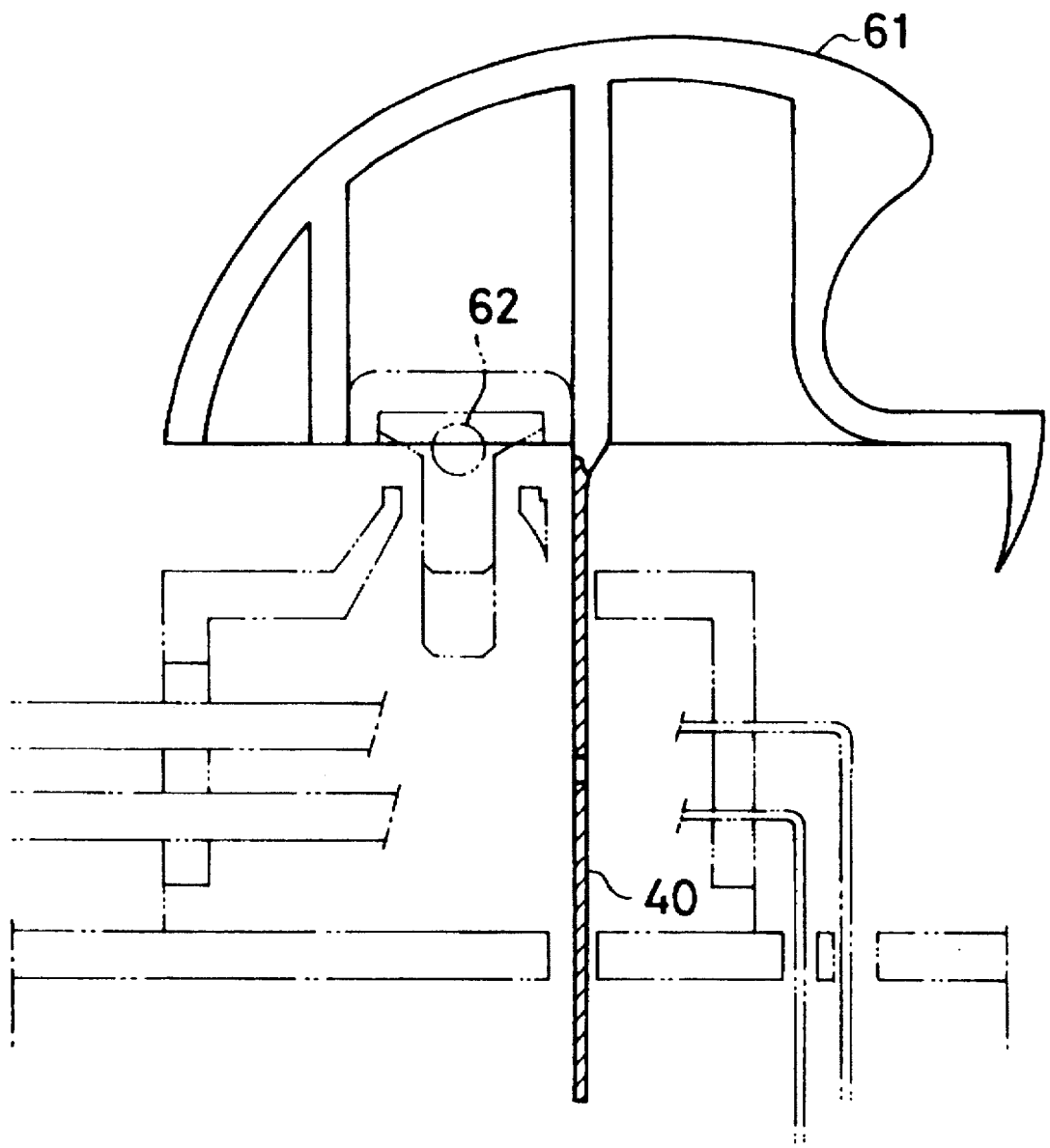
FIG. 11 is a schematic diagram showing a construction of an integrated switch knob and shutter.

The switch knob 61 and the shutters 41, 44 and 47 used in the embodiments according to the first and second type are formed individually and press-fit at the time of assembly. However, the present invention is not limited to this construction. As shown in FIG. 11, the switch knob 61 can be integrated with a shutter 40 (the shutter 44 has different slit positions). With this construction, not only the number of assembly processes is reduced, but also the positions of the slits 42, 45, 46 and 48 can be easily adjusted when the knob is put on the eccentric spindle 62, without any influence from the finish of press fit of the shutters 41, 44 and 47 into the switch knob 61.

Furthermore, the slits 42, 45, 46 and 48 to allow light passage, which are formed in the shutters 41, 44 and 47 in the embodiments according to the first and second type, are described only as holes. However, it is preferable that they be fitted with lenses. If the positioning of an optical fiber is difficult, then a divergent lens can be fitted into the slit. In this way, the optical switch can be securely operational even though a little sacrifice is made in the efficiency of light transmission. On the other hand, if the strength of light is insufficient, a convergent lens can be fitted into the slit. In this way, the efficiency of light transmission is increased. Depending on the condition, the optical switch can be improved in either way to transmit the light more effectively.

What is claimed is:

1. An optical switch comprising:
   an optical interrupter having a light-emitting element and an optical fiber, means positioning said optical fiber coaxial to a light path of said light emitting element with one end of said optical fiber facing said light emitting element, with a predetermined space therebetween;
   a shutter having an elongate light blocking portion with at least one transversely extending slit to allow light passage therethrough, means mounting said shutter in said predetermined space of said optical interrupter for longitudinal sliding movement across said light path of said optical interrupter; and
   shifting means for effecting said longitudinal sliding movement of said shutter;
   wherein:
      said shutter is slid by said shifting means between an "ON" position and an "OFF" position, said "ON" position being where said slit is positioned in said light path in said predetermined space, and said "OFF" position being where the barrier portion of said shutter is positioned in said light path in said predetermined space.

2. The optical switch as set forth in claim 1 wherein a lens is provided in said slit of said shutter.

3. An optical switch comprising:
   an optical interrupter having a light-emitting optical fiber and a light receiving optical fiber, means positioning said light receiving optical fiber coaxial to a light path of said light emitting optical fiber with one end of said light receiving optical fiber facing said light emitting element, with a predetermined space therebetween;
   a shutter having an elongate light blocking portion with at least one transversely extending slit to allow light passage therethrough, means mounting said shutter in said predetermined space of said optical interrupter for longitudinal sliding movement across said light path of said optical interrupter; and
   shifting means for effecting said longitudinal sliding movement of said shutter;
   wherein:
      said shutter is slid by said shifting means between an "ON" position and an "OFF" position, said "ON" position being where said slit is positioned in-said light path in said predetermined space, and said "OFF" position being where the barrier portion of said shutter is positioned in said light path in said predetermined space.

4. The optical switch as set forth in claim 3 wherein a lens is provided in said slit of said shutter.

5. An optical switch comprising:
   first and second optical interrupters, each optical interrupter having a light emitting element and an optical fiber, means positioning said optical fiber coaxial to a light path of said light emitting element with one end of said optical fiber facing said light emitting element with a predetermined space therebetween;

a shutter having an elongate light blocking portion with at least one transversely extending slit to allow light passage therethrough, means mounting said shutter in said predetermined spaces of said first and second optical interrupters for longitudinal sliding movement across both said light paths of said first and second optical interrupters; and shifting means for effecting said longitudinal sliding movement of said shutter;

wherein:

said shutter is slid by said shifting means between a first "ON" position, an "OFF" position and a second "ON" position, said first "ON" position being where said slit is positioned in said light path in said first optical interrupter in said predetermined space, said "OFF" position being where the barrier portion of said shutter is positioned in said light paths of said first and second optical interrupters in said predetermined space, and said second "ON" position being where said slit is positioned in said light path of said second optical interrupter in said predetermined space.

6. The optical switch as set forth in claim 5 wherein a lens is provided in said slit of said shutter.

7. An optical switch comprising:

first and second optical interrupters, each optical interrupter having a light emitting optical fiber and a light-receiving optical fiber, means positioning said optical fiber coaxial to a light path of said light emitting element with one end of said optical fiber faring said light emitting element with a predetermined space therebetween;

a shutter having an elongate light blocking portion with at least one transversely extending slit to allow light passage therethrough, means mounting said shutter in said predetermined spaces of said first and second optical interrupters for longitudinal sliding movement across both said light paths of said first and second optical interrupters; and shifting means for effecting said longitudinal sliding movement of said shutter;

wherein:

said shutter is slid by said shifting means between a first "ON" position, an "OFF" position and a second "ON" position, said first "ON" position being where said slit is positioned in said light path in said first optical interrupter in said predetermined space, said "OFF" position being where the barrier portion of said shutter is positioned in said light paths of said first and second optical interrupters in said predetermined space, and said second "ON" position being where said slit is positioned in said light path of said second optical interrupter in said predetermined space.

8. The optical switch as set forth in claim 7 wherein a lens is provided in said slit of said shutter.

* * * * *

UNITED STATES PATENT AND TRADEMARK OFFICE
CERTIFICATE OF CORRECTION

PATENT NO.    : 5,721,794
DATED         : February 24, 1998
INVENTOR(S)   : Koichi Uchiyama, et. al.

It is certified that error appears in the above-identified patent and that said Letters Patent is hereby corrected as shown below:

Title page, item [30], Priority Data, insert –
Dec. 6, 1995  [JP]   Japan .........7-318223

Feb. 7, 1996  [JP]   Japan .........8-21460

Signed and Sealed this

Second Day of February, 1999

Attest:

*Attesting Officer*

*Acting Commissioner of Patents and Trademarks*